US010228024B2

(12) United States Patent
Hallman

(10) Patent No.: US 10,228,024 B2
(45) Date of Patent: Mar. 12, 2019

(54) REDUCED-WEIGHT BEARING PINS AND METHODS OF MANUFACTURING SUCH BEARING PINS

(71) Applicant: General Electric Company, Schenectady, NY (US)

(72) Inventor: Darren Lee Hallman, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/402,620

(22) Filed: Jan. 10, 2017

(65) Prior Publication Data
US 2018/0195559 A1 Jul. 12, 2018

(51) Int. Cl.
*F16C 19/24* (2006.01)
*F16C 35/063* (2006.01)
(Continued)

(52) U.S. Cl.
CPC .............. *F16C 35/063* (2013.01); *F02C 7/36* (2013.01); *F16C 19/28* (2013.01); *F05D 2230/00* (2013.01); *F05D 2240/50* (2013.01); *F05D 2240/54* (2013.01); *F05D 2260/40311* (2013.01); *F16C 2360/23* (2013.01);
(Continued)

(58) Field of Classification Search
CPC ................ F16C 35/063; F16C 2360/23; F16C 2361/61; F16H 1/28; F16H 57/08; F16H 57/082; F16H 2057/085; F05D 2260/40311
See application file for complete search history.

(56) References Cited

U.S. PATENT DOCUMENTS 4,460,284 A 7/1984 Lauterbach et al.
6,247,847 B1 6/2001 Lob
(Continued)

FOREIGN PATENT DOCUMENTS

CN 203698261 U 7/2014
CN 203730144 U 7/2014
(Continued)

OTHER PUBLICATIONS

Defaye et al., "Analysis of High-Speed Cylindrical Roller Bearing With Flexible Rings Mounted in a Squeeze Film Damper", International Joint Tribology Conference, pp. 387-389, Oct. 22-24, 2007.
(Continued)

*Primary Examiner* — Phillip A Johnson
(74) *Attorney, Agent, or Firm* — GE Global Patent Operation; Nitin N. Joshi

(57) ABSTRACT

A method of designing and manufacturing a bearing pin having an external bearing pin geometry includes generating a first pin model conforming to the external bearing pin geometry. One or more operational loads to be applied to the bearing pin are then simulated on the first pin model to identifying at least one first internal region of the first pin model in which at least one of stress, strain, and displacement are below a first predetermined limit. The method further includes generating a final pin model based on the first pin model by forming a first void by removing the at least one first internal region from the first pin model. The bearing pin is then manufactured in accordance with the final pin model.

11 Claims, 6 Drawing Sheets

(51) Int. Cl.
*F16C 19/28* (2006.01)
*F02C 7/36* (2006.01)
*F16H 1/28* (2006.01)
*F16H 57/08* (2006.01)

(52) U.S. Cl.
CPC ............ *F16C 2361/61* (2013.01); *F16H 1/28* (2013.01); *F16H 57/08* (2013.01); *F16H 2057/085* (2013.01)

(56) References Cited

U.S. PATENT DOCUMENTS

| | | | |
|---|---|---|---|
| 6,896,491 | B2 | 5/2005 | Trubnikov |
| 8,123,413 | B2 | 2/2012 | Tambe et al. |
| 8,172,717 | B2 | 5/2012 | Lopez et al. |
| 8,198,744 | B2 | 6/2012 | Kern et al. |
| 8,230,760 | B1 | 7/2012 | Breeding |
| 8,235,861 | B2 | 8/2012 | Lopez et al. |
| 8,287,423 | B2 | 10/2012 | Lopez et al. |
| 8,298,114 | B2 | 10/2012 | Lopez et al. |
| 8,371,799 | B2 | 2/2013 | Spathias et al. |
| 8,459,872 | B2 | 6/2013 | Nies et al. |
| 8,491,435 | B2 | 7/2013 | Ghanime et al. |
| 8,506,446 | B2 | 8/2013 | Minadeo et al. |
| 8,517,672 | B2 | 8/2013 | McCooey |
| 8,550,955 | B2 | 10/2013 | Erno et al. |
| 8,550,957 | B2 | 10/2013 | Erno et al. |
| 8,657,714 | B1 | 2/2014 | Ghanime et al. |
| 8,696,314 | B2 | 4/2014 | Mashue et al. |
| 8,727,629 | B2 | 5/2014 | Do et al. |
| 8,727,632 | B2 | 5/2014 | Do et al. |
| 8,777,802 | B2 | 7/2014 | Erno et al. |
| 8,857,192 | B2 | 10/2014 | Huang et al. |
| 8,900,090 | B2 | 12/2014 | Sheridan |
| 8,904,746 | B2 | 12/2014 | Fang et al. |
| 9,321,522 | B2 | 4/2016 | Blades |
| 2004/0005221 | A1* | 1/2004 | Lanni ..................... B63H 1/26 416/227 A |
| 2007/0277645 | A1* | 12/2007 | Weisskopf ......... B22D 19/0072 74/579 E |
| 2013/0184120 | A1* | 7/2013 | Altamura .............. F16H 1/2836 475/346 |
| 2016/0047451 | A1 | 2/2016 | Hoshina et al. |
| 2016/0091019 | A1 | 3/2016 | Katsaros et al. |
| 2016/0146112 | A1* | 5/2016 | Van der Merwe ...... F16H 57/08 475/331 |
| 2016/0201509 | A1 | 7/2016 | Sheridan |
| 2016/0201793 | A1* | 7/2016 | Muldoon ................. F16H 1/28 475/159 |

FOREIGN PATENT DOCUMENTS

| | | |
|---|---|---|
| CN | 203730152 U | 7/2014 |
| CN | 102889341 B | 7/2015 |
| EP | 2803436 A2 | 11/2014 |

OTHER PUBLICATIONS

Leblanc et al., "Nonlinear Dynamic Analysis of Cylindrical Roller Bearing with Flexible Rings", Journal of Sound and Vibration, pp. 145-160, vol. 325, Issues 1-2, Aug. 7, 2009.

Kock, "Adjustable Support Bearing", IP.Com, https://priorart.ip.com/IPCOM/000242857, Aug. 26, 2015.

J W Lund, "Stability and Damped Critical Speeds of a Flexible Rotor in Fluid-Film Bearings", Journal of Engineering for Industry, vol. 96, Issue: 2, pp. 509-517, May 1, 1974.

Lee et al., "Cranktrain system geometry optimisation and dynamic assembly of parametric solid models", International Journal of Vehicle Design, vol. 23, Issue: 1/2, pp. 16-29, 2000.

\* cited by examiner

REDUCED-WEIGHT BEARING PINS AND METHODS OF MANUFACTURING SUCH BEARING PINS

BACKGROUND

The field of the disclosure relates generally to reduced-weight gear components for use in aviation engines and methods of manufacturing such components and, more particularly, to gear components of a gearbox in an aviation engine.

Aircraft engines typically include a plurality of gearboxes including a plurality of gears. Some gearboxes include power gearboxes and accessory gearboxes and include epicyclic gear assemblies. Known epicyclic gear assemblies typically include an outer ring gear, a central or sun gear, and a plurality of planet gears disposed between the outer ring gear and the central gear and configured to engage both the ring gear and the central gear. During operation, a drive applies a rotational force to at least one of the ring gear, the plurality of planet gears, and the central gear, thereby inducing rotation of one or more of the other epicyclic gear assembly gears. Planet gears are often coupled together by one or more carriers by bearing pins extending through each planet gear. Known bearing pins are often formed from solid bar stock or billets and, as a result, generally include unnecessary internal material that adds weight to the bearing pin without substantially adding to the overall strength of the bearing pin. Accordingly, such known bearing pins include unnecessary weight and negatively affect the overall efficiency of epicyclic gear assemblies in which they are included.

BRIEF DESCRIPTION

In one aspect, a method of designing and manufacturing a bearing pin having an external bearing pin geometry is provided. The method includes generating a first pin model, conforming to the external bearing pin geometry and simulating loading of the first pin model by simulating one or more operational loads to be applied to the bearing pin. The method further includes identifying at least one first internal region of the first pin model in which at least one of stress, strain, and displacement are below a first predetermined limit when simulating the one or more operational loads. A final pin model is then generated from the first pin model by forming a first void in the first pin model by removing the at least one first internal region from the first pin model. The bearing pin is then manufactured in accordance with the final pin model.

In another aspect, a bearing pin is provided. The bearing pin includes a first internal region having a first density and at least one second internal region having a second density where the second density is less than the first density.

In yet another aspect, a bearing is provided. The bearing includes a bearing housing, a bearing surface, and a bearing pin extending through the housing such that the bearing surface is disposed between the bearing housing and the bearing pin. The bearing pin further includes a bearing pin body comprising a first internal region having a first density and at least one second internal region having a second density, wherein the second density is less than the first density.

DRAWINGS

These and other features, aspects, and advantages of the present disclosure will become better understood when the following detailed description is read with reference to the accompanying drawings in which like characters represent like parts throughout the drawings, wherein.

Figure 1:
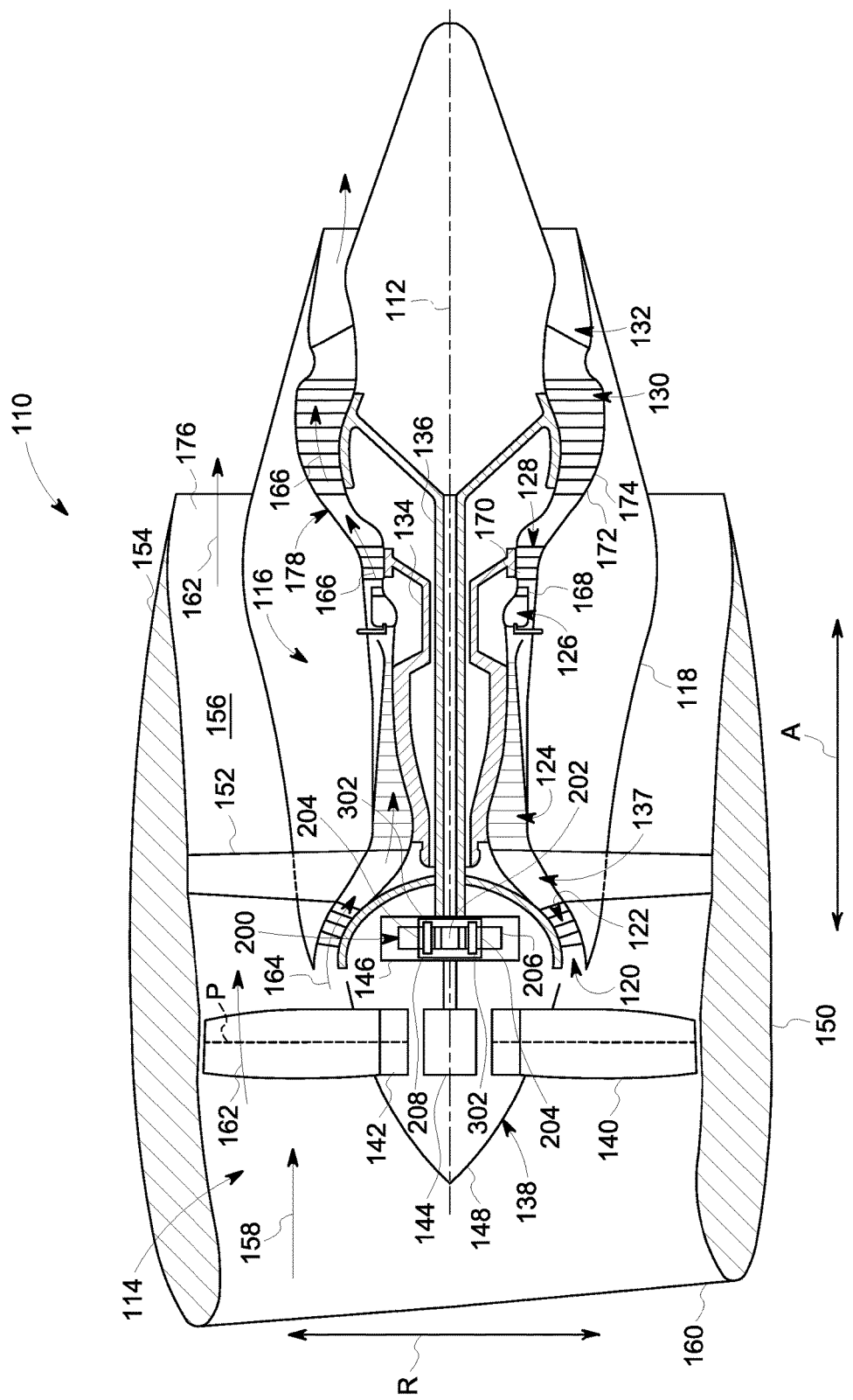
FIG. 1 is a schematic cross-sectional view of an exemplary gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the method for designing and manufacturing a bearing pin and bearing pins described herein facilitate improved performance of epicyclic gear assemblies. More specifically, bearing pins described herein have reduced weights, thereby reducing weight and improving overall efficiency of epicyclic gear assemblies in which they are used. Bearing pins described herein include a bearing pin body including a first internal region having a first density and at least one second internal region have a second density that is less than the first density. The at least one second internal region is encapsulated within the bearing pin such that the overall weight of the bearing pin is reduced without affecting the overall geometry of the bearing pin. The at least one second internal regions generally include a void. In certain embodiments, additional reinforcing structure is disposed within the void. The additional reinforcing structure includes, without limitation, reinforcing members, lattice structures, metal foams, and low-density materials.

A method of manufacturing bearing pins is also described herein. The method generally includes generating a pin model of a bearing pin having the desired external geometry of the bearing pin. The model is then subjected to simulated loading to identify one or more first internal regions in which at least one of stress, strain, and displacement are below a predetermined threshold. To the extent first internal regions are identified, a final model is generated by removing the first internal regions. The bearing pin is then manufactured in accordance with the final model. In certain embodiments, the bearing pin is manufactured using techniques including, without limitation, additive manufacturing, brazing, and diffusion bonding. In certain embodiments, the method is iterative and includes generating a second pin model from the first pin model, the second pin model having the first internal regions removed. The operational loads are then simulated on the second pin model. To the extent second internal regions are identified in which at least one of stress, strain, and displacement are below the predetermined threshold, the final pin model is further generated by removing the second internal regions. This iterative process may continue with subsequent pin models until no additional material can be removed without exceeding the predetermined threshold. If, on the other hand, simulating the operational loads on the second pin model (or any subsequent pin model in an iterative design process) identifies one or more regions in which at least one of stress, strain, and displacement are above a predetermined threshold, reinforcement is inserted into the volume corresponding to one of the previously identified internal regions. Reinforcement includes, without limitation, reinforcing members, lattice structures, metal foams, and low-density materials.

FIG. 1 is a schematic cross-sectional view of a gas turbine engine 110 in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section 123, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed. In an alternative embodiment, fan blade 140 is a fixed pitch fan blade rather than a variable pitch fan blade.

In the exemplary embodiment, power gear box 146 houses an epicyclic gear assembly 200. As described below in further detail with respect to FIG. 2, epicyclic gear assembly 200 includes a sun gear 202, a plurality of planet gears 204, a ring gear 206 and a carrier 208. In certain embodiments, carrier 208 couples to each side of planet gears 204. More specifically, carrier 208 is coupled to planet gears 204 by bearing pins 302 extending through planet gears 204.

In the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted by sequential stages of HP turbine stator vanes 168 that are coupled to outer casing 118 and HP turbine rotor blades 170 that are coupled to HP shaft or spool 134, thus inducing HP shaft or spool 134 to rotate, thereby supporting operation of HP compressor 124. Combustion gases 166 are then routed through LP turbine 130 where a second portion of thermal and kinetic energy is extracted from combustion gases 166 by sequential stages of LP turbine stator vanes 172 that are coupled to outer casing 118 and LP turbine rotor blades 174 that are coupled to LP shaft or spool 136, thus inducing LP shaft or spool 136 to rotate which induces power gear box 146 to rotate LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration. In still other embodiments, aspects of the present disclosure may be incorporated into any other suitable gas turbine engine. For example, in other embodiments, aspects of the present disclosure may be incorporated into, e.g., a turboprop engine.

Figure 2:
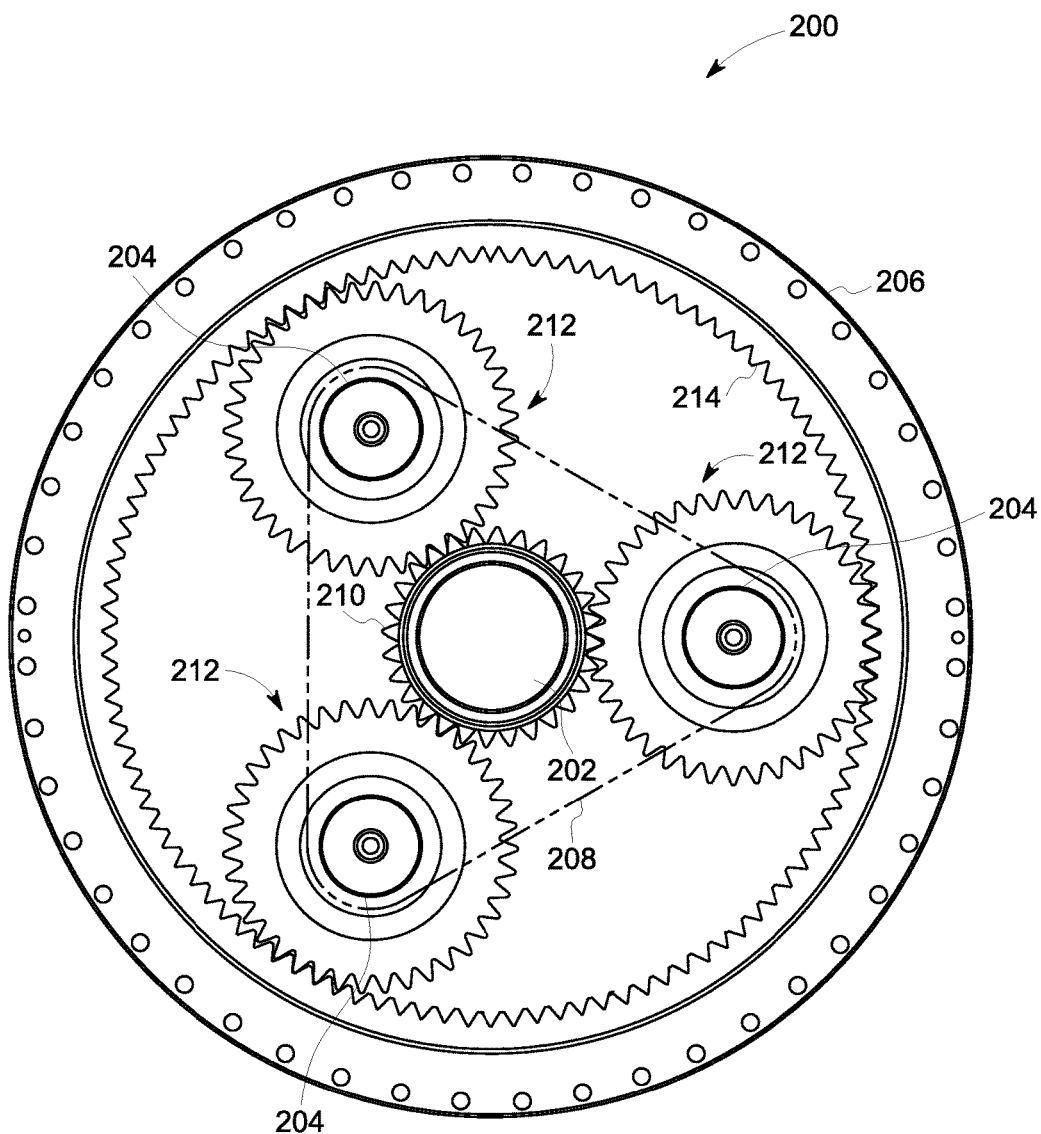
FIG. 2 is a schematic diagram of an exemplary epicyclic gear assembly of the gas turbine engine shown in FIG. 1.

FIG. 2 is a schematic diagram of epicyclic gear assembly 200 of exemplary gas turbine engine 110 (shown in FIG. 1). In the exemplary embodiment, epicyclic gear assembly 200 is a planet gear assembly. In one embodiment, epicyclic gear assembly 200 is housed within power gearbox 146 (shown in FIG. 1). In other embodiments, epicyclic gear assembly 200 is located adjacent to power gearbox 146 and is mechanically coupled to it.

Epicyclic gear assembly 200 includes a sun gear 202, a plurality of planet gears 204, a ring gear 206, a carrier 208 coupled each side of planet gears 204. In alternative embodiments, epicyclic gear assembly 200 is not limited to three planet gears 204. Rather, any number of planet gears may be used that enables operation of epicyclic gear assembly 200 as described herein. In some embodiments, LP shaft or spool 136 (shown in FIG. 1) is fixedly coupled to sun gear 202. Sun gear 202 is configured to engage planet gears 204 through a plurality of complementary sun gear teeth 210 and a plurality of complementary planet gear teeth 212 circumferentially spaced about a radially outer periphery of sun gear 202 and a radially outer periphery of planet gears 204 respectively. Planet gears 204 are maintained in a position relative to each other by carrier 208. For example, in epicyclic gear assembly 200, each of planet gears 204 include a bearing pin 302 configured to extend through planet gears 204 and to couple planet gears 204 to carrier 208. Planet gears 204 are configured to engage ring gear 206 through a plurality of complementary ring gear teeth 214 and complementary planet gear teeth 212 circumferentially spaced about a radially inner periphery of ring gear 206 and a radially outer periphery of planet gears 204 respectively. Ring gear 206 is rotationally coupled to fan blades 140 (shown in FIG. 1), disk 142 (shown in FIG. 1), and pitch change mechanism 144 (shown in FIG. 1) extending axially from ring gear 206. LP turbine 130 rotates the LP compressor 122 at a constant speed and torque ratio which is determined by a function of ring gear teeth 214, planet gear teeth 212, and sun gear teeth 210 as well as how power gearbox 146 is restrained.

Epicyclic gear assembly 200 may be configured in three possible configurations: planetary, star, and solar. In the planetary configuration, ring gear 206 remains stationary while sun gear 202, planet gears 204, and carrier 208 rotate. LP shaft or spool 136 drives sun gear 202 which is configured to rotate planet gears 204 that are configured to rotate carrier 208. Carrier 208 drives fan blades 140, disk 142, and pitch change mechanism 144. Sun gear 202 and carrier 208 rotate in the same direction.

In the star configuration, carrier 208 remains stationary while sun gear 202 and ring gear 206 rotate. LP shaft or spool 136 drives sun gear 202 which is configured to rotate planet gears 204. Planet gears 204 are configured to rotate ring gear 206 and carrier 208 is fixedly coupled to power gearbox 146. Carrier 208 maintains planet gears 204 positioning while allowing planet gears 204 to rotate. Ring gear 206 is rotationally coupled to fan blades 140, disk 142, and pitch change mechanism 144. Sun gear 202 and ring gear 206 rotate in opposite directions.

In the solar configuration, sun gear 202 remains stationary while planet gears 204, ring gear 206 and carrier 208 rotate. LP shaft or spool 136 may drive either the ring gear 206 or carrier 208. When LP shaft or spool 136 is coupled to carrier 208, planet gears 204 are configured to rotate ring gear 206 which drives fan blades 140, disk 142, and pitch change mechanism 144. Ring gear 206 and carrier 208 rotate in the same direction.

In the solar configuration where LP shaft or spool 136 is coupled to ring gear 206, ring gear 206 is configured to rotate planet gears 204 and carrier 208. Carrier 208 drives fan blades 140, disk 142, and pitch change mechanism 144. Ring gear 206 and carrier 208 rotate in the same direction.

During operation of epicyclic gear assembly 200, forces are transferred between planet gears 204 and carrier 208 through bearing pins 302. More specifically, rotational forces applied to either of carrier 208 and ring gears 204 are transferred to ring gears 204 and carrier 208, respectively, through bearing pins 302. For example, during operation in the planetary configuration of epicyclic gear assembly 200 (shown in FIG. 2), sun gear 202 is driven while ring gear 206 is kept stationary, thereby inducing rotation of planet gears 204, and carrier 208. Accordingly, in the planetary configuration, rotational force is transmitted from sun gear 202 to planet gears 204 and then from planet gears 204 to carrier 208 through bearing pins 302. In the solar configuration, sun gear 202 remains stationary while one of carrier 208 and ring gear 206 is made to rotate. If carrier 208 is rotated, a force is imparted to planet gears 204 through bearing pins 302. If ring gear 206 is rotated, planet gears 204 apply a force to carrier 208 through bearing pins 302, thereby inducing carrier 208 to rotate.

Figure 3:
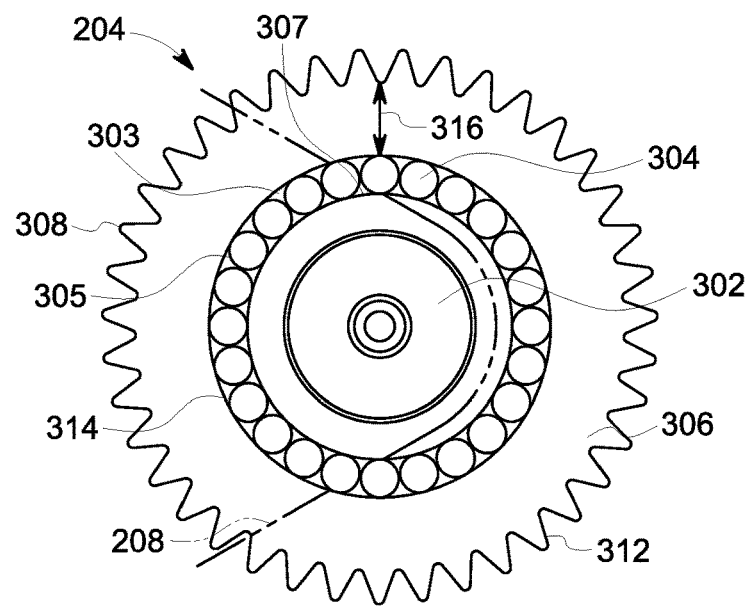
FIG. 3 is a schematic diagram of an exemplary planet gear of the epicyclic gear assembly shown in FIG. 2.

FIG. 3 is a schematic diagram of exemplary planet gear 204 of epicyclic gear assembly 200 (shown in FIG. 2). Planet gear 204 includes a bearing pin 302, a bearing 303, a gear rim 306, and a plurality of teeth 308. Gear rim 306 includes an outer radial surface or gear root diameter 312, an inner radial surface 314, and a thickness 316. Carrier 208 is coupled to bearing pin 302. Teeth 308 are disposed circumferentially about outer radial surface 312. Thickness 316 is the radial distance between outer radial surface 312 at the gear root and inner radial surface 314.

Bearing 303 of planet gear 204 is a roller element bearing and includes a bearing housing 305, a bearing surface 307 configured to contact bearing pin 302 when planet gear 204 is assembled, and a plurality of rolling elements 304 disposed between bearing housing 305 and bearing surface 307. In planet gear 204, bearing housing is integral with gear rim 306. In other embodiments, bearing housing may include an outer raceway configured to be inserted into gear rim 306. Similarly, bearing surface 307 is shown as a contact surface between bearing 302 and bearing pin 302. In other embodiments, bearing surface 307 may be an inner raceway disposed between roller elements 304 and bearing pin 302.

In other embodiments, bearing 303 is a journal bearing. In such embodiments, bearing housing 305 is generally integrated with gear rim 306 or is a bushing or similar plain bearing inserted into gear rim 306 and bearing surface 307 is formed by a film of oil disposed between bearing housing 305 and bearing pin 302.

Figure 4:
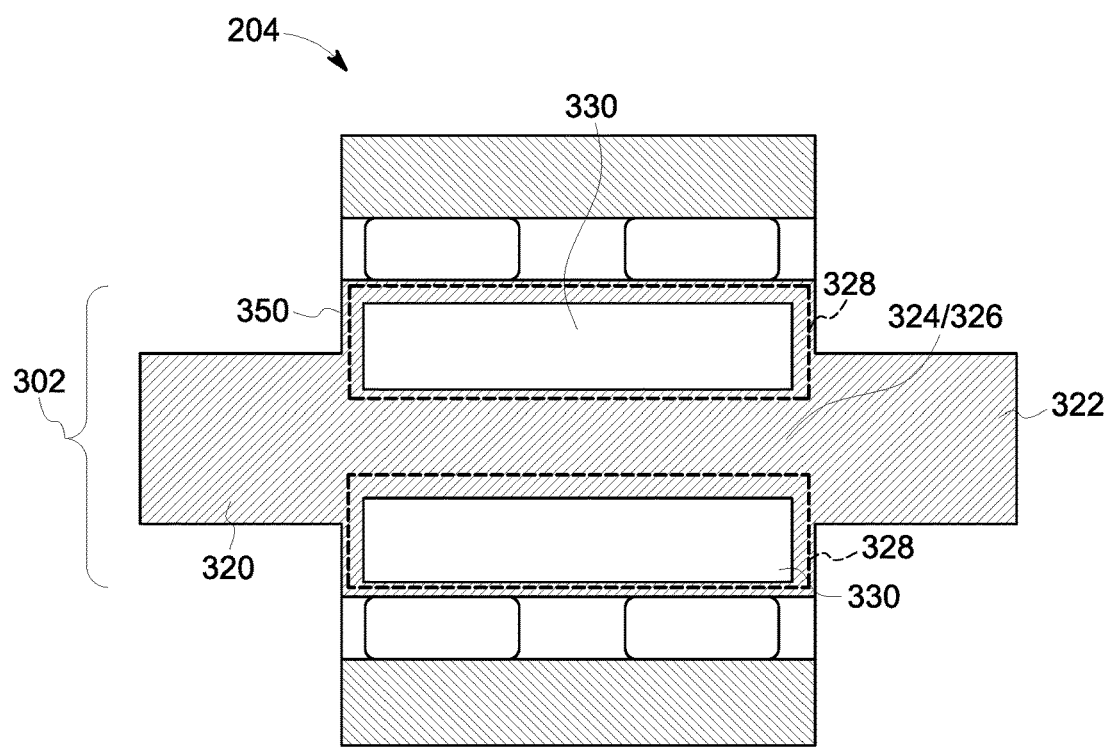
FIG. 4 is a cross-sectional view of the planet gear shown in FIG. 3.

FIG. 4 is a cross-sectional view of planet gear 204. Bearing pin 302 extends axially through planet gear 204. Bearing pin 302 includes a forward end 320 and an aft end 322 opposite forward end 320. Bearing pin 302 further includes a bearing pin body 324. Bearing pin body 324 includes a first internal region 326 having a first density and a second internal region 328 having a second density that is less than the first density. In planet gear 204, first internal region 326 corresponds to solid internal regions of bearing pin body 324 while second internal region 328 corresponds to an annular void 330 defined by bearing pin body 324. In bearing pin 302, void 330 is defined within an annular shoulder 350 of bearing pin 302.

In the exemplary embodiment, bearing pin 302 is formed unitarily of a sintered metal material, using for example, an additive manufacturing process. The sintered metal material comprises a superalloy material, such as, but not limited to cobalt chrome and austenite nickel-chromium-based superalloys. As used herein, "additive manufacturing" refers to any process which results in a three-dimensional object and includes a step of sequentially forming the shape of the object one layer at a time. Additive manufacturing processes include, for example, three dimensional printing, laser-net-shape manufacturing, direct metal laser sintering (DMLS), direct metal laser melting (DMLM), selective laser sintering (SLS), plasma transferred arc, and freeform fabrication. One exemplary type of additive manufacturing process uses a laser beam to sinter or melt a powder material. Additive manufacturing processes may employ powder materials or wire as a raw material. Moreover, additive manufacturing processes may generally relate to a rapid way to manufacture an object (article, component, part, product, etc.) where a plurality of thin unit layers are sequentially formed to produce the object. For example, layers of a powder material may be provided (e.g., laid down) and irradiated with an energy beam (e.g., laser beam) so that the particles of the powder material within each layer are sequentially sintered (fused) or melted to solidify the layer.

In other embodiments, bearing pin 302 is formed from one or more components coupled together using processes including, without limitation, brazing and diffusion bonding. For example, in certain embodiments bearing pin 302 is formed from multiple pieces that may be individually manufactured and that are then brazed, diffusion bonded, or otherwise joined into a unitary body. Individual pieces of bearing pin 302 may be formed using various techniques including, without limitation, additive manufacturing, machining, forming, welding, and any combination thereof.

Figure 5:
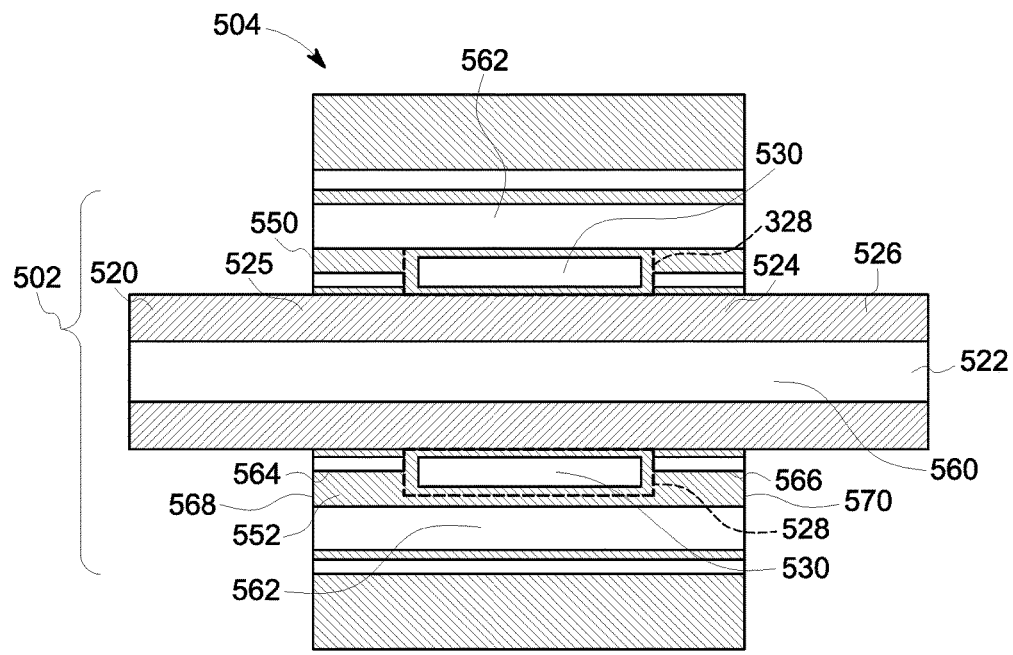
FIG. 5 is a cross-sectional view of an alternative planet gear that may be used in the epicyclic gear assembly shown in FIG. 2.

FIG. 5 is a cross-sectional side view of an alternative planet gear 504 that may be used in epicyclic gear assembly 200 (shown in FIG. 2). Bearing pin 502 extends axially through planet gear 504. Bearing pin 502 includes a forward end 520 and an aft end 522 opposite forward end 520. Bearing pin 502 further includes a bearing pin body 524 that includes an annular sleeve 552 coupled to a central pin 525. Accordingly, annular sleeve 552 forms an annular shoulder 550 disposed between forward end 520 and aft end 522. Bearing pin body 524 includes a first internal region 526 having a first density and second internal regions 528 having a second density that is less than the first density. In planet gear 504, first internal region 526 corresponds to solid internal regions of bearing pin body 524 while second internal region 528 corresponds to voids 530 defined by bearing pin body 524. More specifically, voids 530 are defined within annular sleeve 552.

Bearing pin 502 includes additional features configured to reduce the overall weight of bearing pin 502. Weight reduction features generally include portions of bearing pin 502 from which material has been removed. Weight reduction features may include, without limitation, bores extending into and/or through bearing pin 502 and grooves cut into exterior surfaces of bearing pin 502. In bearing pin 502, weight reduction features include a central pin through bore 560 extending through central pin 525, annular sleeve through bores 562 extending into annular sleeve 552 and a first annular groove 564 and a second annular groove 566 formed in a first face 568 and a second face 570 of annular sleeve 552, respectively.

Figure 6:
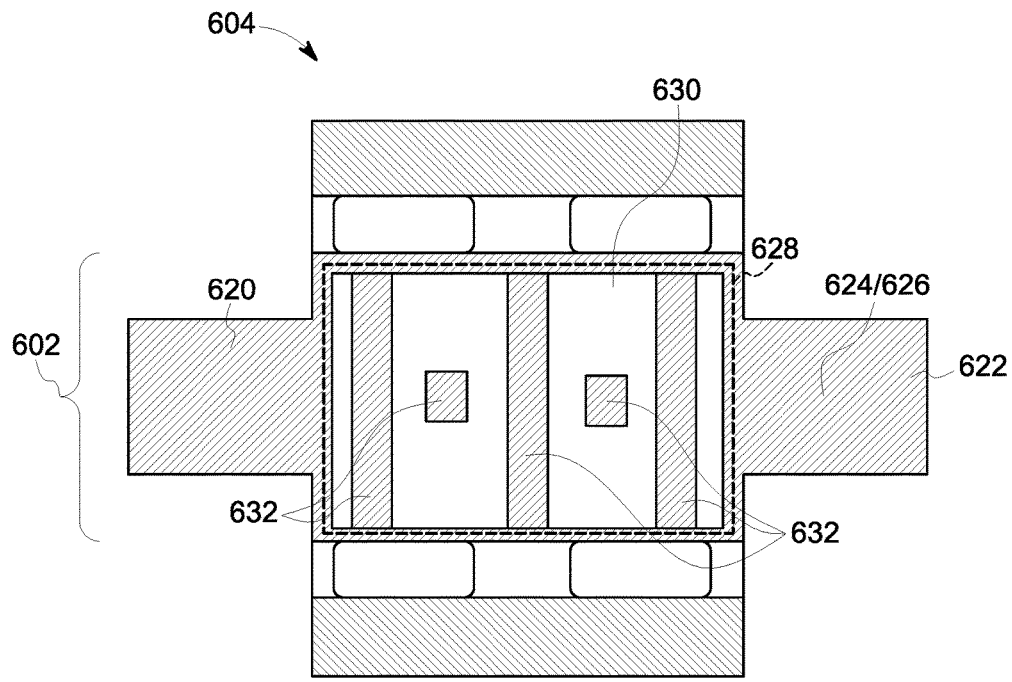
FIG. 6 is a cross-sectional view of another alternative planet gear that may be used in the epicyclic gear assembly shown in FIG. 2.

FIG. 6 is a cross-sectional side view of another alternative planet gear 604 that may be used in epicyclic gear assembly 200 (shown in FIG. 2). A bearing pin 602 extends axially through planet gear 604. Bearing pin 602 includes a forward end 620 and an aft end 622 opposite forward end 620. Bearing pin 602 further includes a bearing pin body 624. Bearing pin body 624 includes at least one first internal region 626 having a first density and a second internal region 628 having a second density that is less than the first density. In planet gear 604, first internal region 626 corresponds to solid internal regions of bearing pin body 624 while second internal region 628 corresponds to a void 630 defined by bearing pin body 624.

Planet gear 604 further includes one or more reinforcing members 632 disposed within void 630. More specifically, reinforcing members 632 extend through at least a portion of void 630 to provide additional structural integrity to second internal region 628. In planet gear 604, reinforcing members 632 are a plurality of beams, each extending radially through void 630. More specifically, reinforcing members 632 extend radially through void 630 and adjacent reinforcing members 632 are arranged perpendicularly with respect to each other. The arrangement of reinforcing members 632 of planet gear 604 is only an example of the possible arrangements of reinforcing members that may be disposed within void 630. For example, in other embodiments, any suitable number of reinforcing members may be disposed within void 630 such that the overall density of second internal region 628 remains below that of first internal region 626. Each reinforcing member may be arranged in any direction including, without limitation, axially, radially, and at a bias relative to the axial and radial direction. Moreover, reinforcing members 632 are not limited to bar shaped members. In other embodiments, reinforcing members 632 may include, without limitation, tubular members, discs, and rings. In certain embodiments, reinforcing members 632 are formed using an additive manufacturing process of bearing pin 602. Accordingly, upon completion of the additive manufacturing process, reinforcing members 632 are encapsulated within bearing pin 602.

Figure 7:
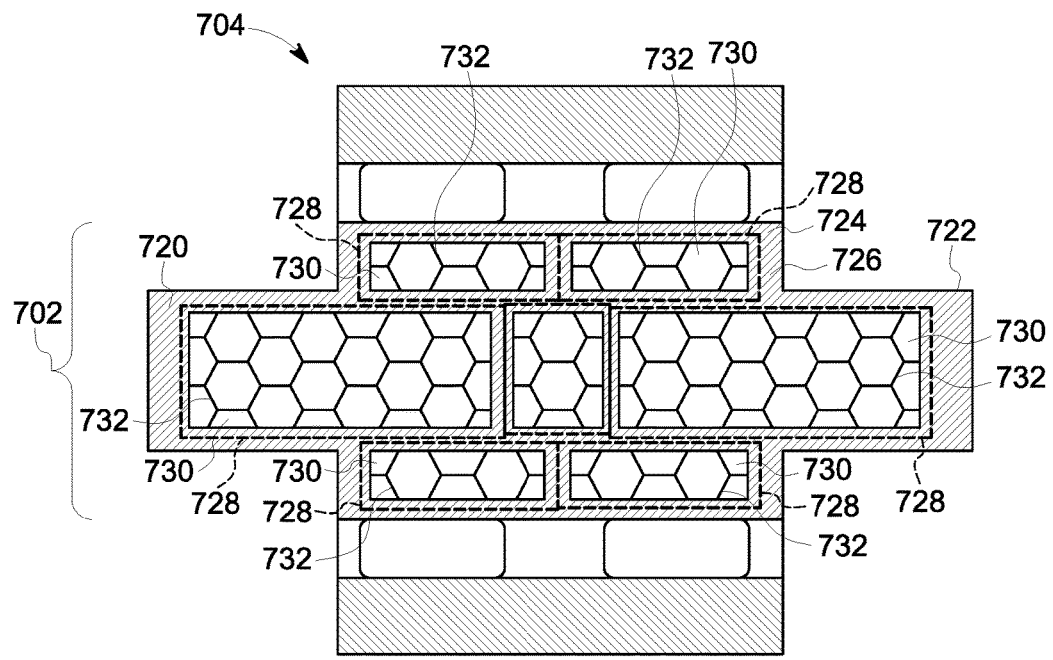
FIG. 7 is a cross-sectional side view of yet another alternative planet gear that may be used in the epicyclic gear assembly shown in FIG. 2.

FIG. 7 is a cross-sectional side view of yet another alternative planet gear 704 that may be used in epicyclic gear assembly 200 (shown in FIG. 2). A bearing pin 702 extends axially through planet gear 704. Bearing pin 702 includes a forward end 720 and an aft end 722 opposite forward end 720. Bearing pin 702 further includes a bearing pin body 724. Bearing pin body 724 includes at least one first internal region 726 having a first density and a plurality of second internal regions 728 having a second density that is less than the first density. In planet gear 704, first internal region 726 corresponds to solid internal regions of bearing pin body 724 while second internal regions 728 correspond to a plurality of voids 730 defined by bearing pin body 724.

Planet gear further includes lattice structures 732 disposed within each of voids 730. More specifically, reinforcement of second internal regions 728 is facilitated by hexagonal lattice structures 732 disposed within each void 730. Hexagonal lattice structures 732 are only an example of lattice structures that may be disposed within voids 730. For example, in other embodiments other lattice structures may be used including, without limitation, cubic lattices, tetragonal lattices, orthorhombic lattices, rhombohedral lattices, tetrahedral lattices, monoclinic lattices, triclinic lattices, and any combination thereof. In certain embodiments, lattice structures 732 are formed using an additive manufacturing process of bearing pin 702. Accordingly, upon completion of the additive manufacturing process, lattice structures 732 are encapsulated within bearing pin 702.

Figure 8:
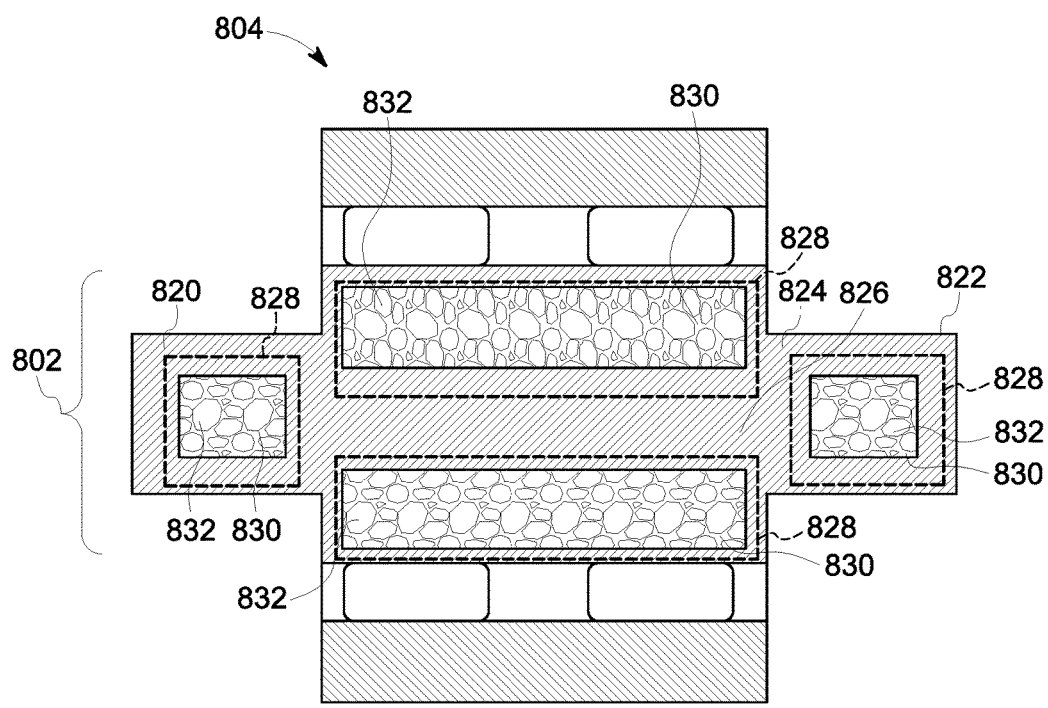
FIG. 8 is a cross-sectional side view of still another planet gear that may be used in the epicyclic gear assembly shown in FIG. 2.

FIG. 8 is a cross-sectional side view of still another alternative planet gear 804 that may be used in epicyclic gear assembly 200 (shown in FIG. 2). A bearing pin 802 extends axially through planet gear 804. Bearing pin 802 includes a forward end 820 and an aft end 822 opposite forward end 820. Bearing pin 802 further includes a bearing pin body 824. Bearing pin body 824 includes at least one first internal region 826 having a first density and a plurality of second internal region 828 having a second density that is less than the first density. In planet gear 804, first internal region 826 corresponds to solid internal regions of bearing pin body 824 while second internal regions 828 correspond to a plurality of voids 830 defined by bearing pin body 824.

To provide addition structural integrity, a metal foam 832 is disposed within each of voids 830. Metal foam 832 may include, without limitation, open-cell metal foams and closed-cell metal foams. Metal foam 832 may also include composite metal foams in which hollow metallic beads of a first metal are disposed within a solid matrix of a second metal. In certain embodiments, metal foam 832 is formed in situ within voids 830. In other embodiments, metal foam 832 is fabricated separately from bearing pin 802 to fit within voids 830. More specifically, metal foam 832 is inserted into voids 830 during an additive manufacturing process of bearing pin 802 such that at the completion of the additive manufacturing process, metal foam 832 is encapsulated within bearing pin 802.

Figure 9:
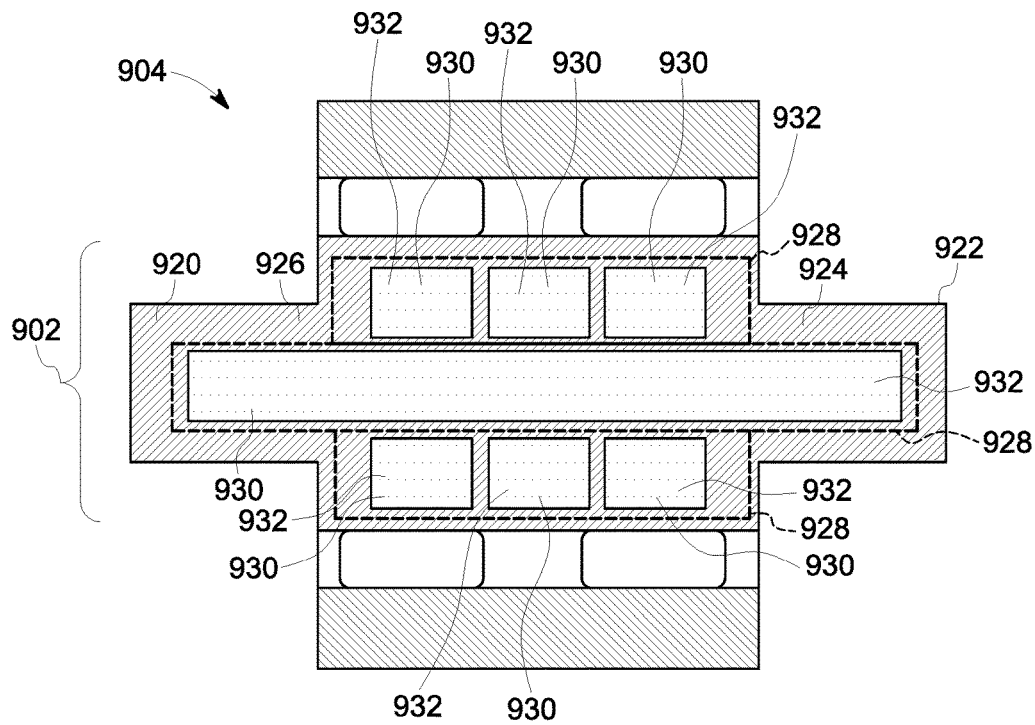
FIG. 9 is a cross-sectional side view of another planet gear that may be used in the epicyclic gear assembly shown in FIG. 2.

FIG. 9 is a cross-sectional side view of still another alternative planet gear 904 that may be used in epicyclic gear assembly 200 (shown in FIG. 2). A bearing pin 902 extends axially through planet gear 904. Bearing pin 902 includes a forward end 920 and an aft end 922 opposite forward end 920. Bearing pin 902 further includes a bearing pin body 924. Bearing pin body 924 includes at least one first internal region 926 having a first density and a plurality of second internal regions 928 having a second density that is less than the first density. In planet gear 904, first internal region 926 corresponds to solid internal regions of bearing pin body 924 while second internal region 928 corresponds to a plurality of voids 930 defined by bearing pin body 924.

In planet gear 904, bearing pin body 924 is generally formed of a first material having a first density. Planet gear 904 includes a plurality of inserts 932 formed of a second material having a second density, the second density less than the first density. In certain embodiments, inserts 932 are formed in situ within voids 930. In other embodiments, inserts 932 are fabricated separately from bearing pin 902 to fit within voids 930. More specifically, inserts 932 are inserted into voids 930 during an additive manufacturing process of bearing pin 902 such that at the completion of the additive manufacturing process, inserts 932 are encapsulated within bearing pin 902.

Figure 10:
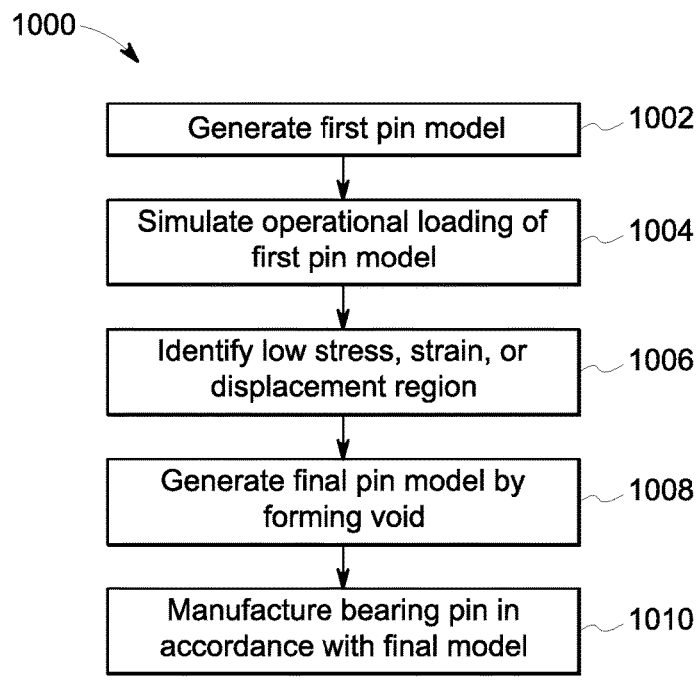
FIG. 10 is a flow chart illustrating a method for manufacturing a bearing pin for use in the epicyclic gear assembly shown in FIG. 2.

FIG. 10 is a flow chart illustrating a method 1000 for manufacturing a bearing pin, such as bearing pin 302 (shown in FIG. 2). Bearing pin 302 generally has an external bearing pin geometry. The external bearing pin geometry may be based, at least in part, on corresponding geometry of one or more of a bearing, a gear, and other components of the epicyclic gear assembly in which bearing pin 302 is to be used. Method 1000 includes generating a first pin model 1002 based on the external bearing pin geometry of bearing pin 302. In certain embodiments, the first pin model corresponds to a computer model of bearing pin 302. At step 1004, one or more loads are simulated on the first pin model corresponding to operational loads to be applied to the bearing pin. At step 1006, at least one first internal region is identified in which at least one of stress, strain, and displacement is below a first predetermined threshold. At step 1008, a final pin model is generated. More specifically, the final pin model is generated by removing the at least one first internal region from the first pin model. At step 1010, bearing pin 302 is manufactured in accordance with the final pin model.

In certain embodiments, the method for designing and manufacturing bearing pin 302 is an iterative process. More specifically, after identifying the one or more first regions in which at least one of stress, strain, and displacement are below the first predetermined threshold, a second pin model is generated in which the first internal regions are removed. The operational loads are then simulated on the second pin model. If one or more second internal regions are identified in which at least one of stress, strain, and displacement are below the first predetermined threshold, a subsequent model of the bearing pin is generated by further removing the one or more second internal regions. The process of simulating operational loads, identifying internal regions having at least one of stress, strain, and displacement below the first predetermined threshold, and generating subsequent bearing pin models with the identified internal regions removed may be repeated multiple times. A final pin model is then generated having each of the previously identified internal regions removed. If, during the iterative design process, one or more internal regions are identified in which at least one of stress, strain, and displacement are above a second predetermined threshold, the final model may further include inserting reinforcement within voids formed by removing previously identified internal regions. Reinforcement may include, without limitation, one or more of reinforcing members, lattice structures, metal foams, and low-density materials.

The above-described bearing pin and corresponding methods of manufacturing provides an efficient method for reducing bearing pin weight, thereby improving overall efficiency of epicyclic gear assemblies in which such bearing pins are used. Specifically, the bearing pin disclosed herein includes at least one internal low density region that reduces the overall weight of the bearing pin without impacting the overall external geometry and strength of the bearing pin. In certain embodiments, the internal low density region includes one or more voids. In other embodiments, the voids additional reinforcement is disposed within the voids including, without limitation, reinforcing members, reinforcing members, lattice structures, metal foams, and low-density materials. Bearing pins disclosed herein are generally formed using an additive manufacturing process such that the internal low density regions are fully encapsulated within a body of the bearing pin.

An exemplary technical effect of the methods, systems, and apparatus described herein includes at least one of: (a) improving efficiency of epicyclic gear assemblies by reducing weight of epicyclic gear components; (b) reducing the amount of materials used in manufacturing bearing pins; (c) facilitating placement of material within the bearing pin to better reflect operational loading; and (d) increasing the power output of an epicyclic gear assembly.

Exemplary embodiments of the bearing pin and corresponding methods of manufacturing are described above in detail. The bearing pin and methods of manufacturing are not limited to the specific embodiments described herein, but rather, components of systems and/or steps of the methods may be utilized independently and separately from other components and/or steps described herein. For example, the methods may also be used in combination with other systems which require a gear, and are not limited to practice with only the systems and methods as described herein. Rather, the exemplary embodiment may be implemented and utilized in connection with many other machinery applications that require bearing pins.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing pin comprising:
   a bearing pin body comprising:
      a first internal region having a first density;
      at least one second internal region having a second density, wherein the second density is less than the first density; and
      an annular sleeve and a central pin extending axially through said annular sleeve, wherein said annular sleeve comprises said at least one second internal region.

2. The bearing pin in accordance with claim 1, wherein said at least one second internal region comprises a void defined by said bearing pin body.

3. The bearing pin in accordance with claim 2, wherein said at least one second internal region further comprises at least one reinforcing member extending through said void.

4. The bearing pin in accordance with claim 2, wherein said at least one second internal region further comprises a lattice disposed within said void.

5. The bearing pin in accordance with claim 1, wherein said first internal region comprises a first material having the first density and said at least one second internal region comprises a second material having the second density.

6. The bearing pin in accordance with claim 1, wherein said at least one second internal region comprises a metal foam.

7. The bearing pin in accordance with claim 1, wherein said bearing pin body further comprises:
   a forward end;
   an aft end axially opposite said forward end; and
   an annular shoulder disposed between said forward end and said aft end, wherein said annular shoulder comprises said at least one second region.

8. A bearing comprising:
   a bearing housing;
   a bearing surface; and
   a bearing pin extending through said housing, wherein said bearing surface is disposed between said bearing housing and said bearing pin, and wherein said bearing pin comprises:
      a bearing pin body comprising:
         a first internal region having a first density;
         at least one second internal region having a second density, wherein the second density is less than the first density; and
         an annular sleeve and a central pin extending axially through said annular sleeve, said annular sleeve comprising said at least one second internal region.

9. The bearing in accordance with claim 8, wherein said at least one second internal region includes a void defined by said bearing pin body.

10. The bearing in accordance with claim 9, wherein said at least one second internal region comprises at least one of:
    a reinforcing member disposed within said void;
    a lattice disposed within said void; and
    a metal foam disposed within said void.

11. The bearing in accordance with claim 8, wherein said bearing pin body further comprises:
    a forward end;
    an aft end axially opposite said forward end; and
    an annular shoulder disposed between said forward end and said aft end, wherein said annular shoulder comprises said at least one second internal region.

* * * * *